United States Patent [19]
Olson et al.

[11] Patent Number: 5,184,874
[45] Date of Patent: Feb. 9, 1993

[54] INJECTION MOLDED PLASTIC BICYCLE WHEEL

[76] Inventors: Paul D. Olson, 700 W. Walnut #98, Orange, Calif. 92668; Kirk G. Jones, 1805 Via Allena, Oceanside, Calif. 92056

[21] Appl. No.: 702,046

[22] Filed: May 17, 1991

Related U.S. Application Data

[63] Continuation-in-part of Ser. No. 506,715, Apr. 10, 1990, abandoned.

[51] Int. Cl.[5] .............................................. B60B 5/02
[52] U.S. Cl. ................................... 301/64.7; 301/104
[58] Field of Search ................. 301/54, 63 PW, 64 R, 301/67, 74, 95–98, 104, 105 B

[56] References Cited

U.S. PATENT DOCUMENTS

| | | |
|---|---|---|
| D. 303,516 | 9/1989 | Arredondo, Jr. . |
| 3,656,531 | 4/1972 | Ross et al. .................. 301/63 PW X |
| 3,695,729 | 10/1972 | Schwerdhofer ............... 301/63 PW |
| 3,807,474 | 4/1974 | Wendt et al. . |
| 3,862,779 | 1/1975 | Jayne ........................ 301/63 PW X |
| 4,095,846 | 6/1978 | Agins . |
| 4,280,736 | 7/1981 | Raudman . |
| 4,314,964 | 2/1982 | Ferrary . |
| 4,330,914 | 5/1982 | Hood . |
| 4,405,179 | 9/1983 | Boudreau et al. . |
| 4,447,093 | 5/1984 | Cunard et al. . |
| 4,508,392 | 4/1985 | LeBlond et al. . |
| 4,527,839 | 7/1985 | Fujitaka et al. ............. 301/63 PW X |
| 4,588,542 | 5/1986 | Pierce . |
| 4,634,189 | 1/1987 | LeBlond et al. . |
| 4,639,046 | 1/1987 | Oleff et al. . |
| 4,682,393 | 7/1987 | Corkery . |
| 4,699,432 | 10/1987 | Klamer . |
| 4,741,578 | 5/1988 | Viellard . |
| 4,793,659 | 12/1988 | Oleff et al. .................... 301/63 PW |
| 4,818,034 | 4/1989 | Djerf . |
| 4,919,490 | 4/1990 | Hopkins et al. ............... 301/63 PW |
| 4,930,843 | 6/1990 | Lewis ............................ 301/63 PW |
| 4,930,844 | 6/1990 | Giroux ......................... 301/63 PW |
| 4,983,430 | 1/1991 | Sargent ..................... 301/63 PW X |

FOREIGN PATENT DOCUMENTS 3536308  4/1987  Fed. Rep. of Germany ........ 301/63 PW Primary Examiner—Russell D. Stormer
Attorney, Agent, or Firm—Plante, Strauss & Vanderburgh

[57] ABSTRACT

There is disclosed a hollow-form wheel formed entirely by injection molding of plastic. The wheel has an integral, central sleeve to receive a wheel hub assembly, at least three, hollow-form, integral spokes that are symmetrically located at equal angular spacings about the hub, and an integrally formed annular rim having a peripheral channel to receive a tire. The wall thickness of the sidewalls of the rims and spokes and the central hub area of the wheel are of uniform thickness to provide the strength and stiffness propeties at least equal to those of a metal spoked wheel.

23 Claims, 2 Drawing Sheets

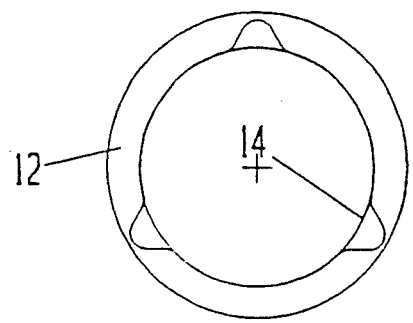
FIGURE 11
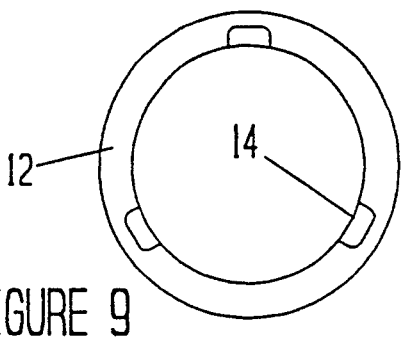
FIGURE 9
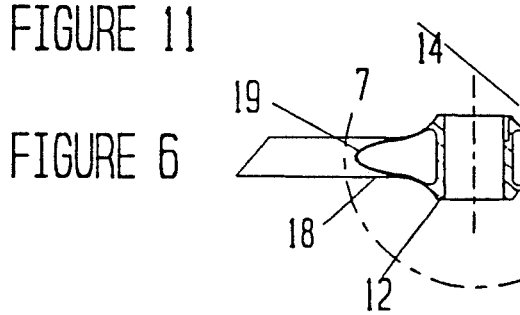
FIGURE 6
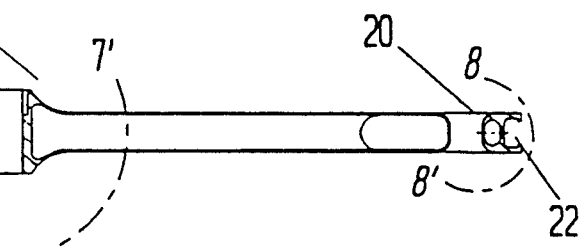
FIGURE 7
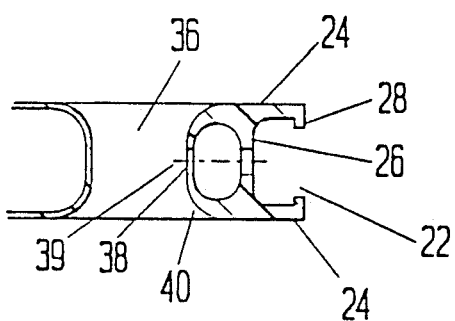
FIGURE 8
FIGURE 10
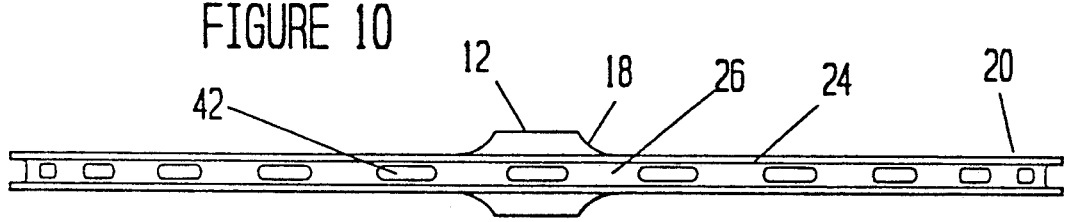

INJECTION MOLDED PLASTIC BICYCLE WHEEL

RELATIONSHIP TO OTHER APPLICATIONS

This application is a continuation-in-part of application, Ser. No. 07/506,715, filed Apr. 10, 1990 and now abandoned.

BACKGROUND OF THE INVENTION

1. Field of the Invention

This invention relates a molded plastic wheel and, in particular, to a single-piece, hollow-form, integral wheel for use on bicycles.

2. Brief Statement of the Prior Art

Plastic wheels for bicycles and other applications have been provided by a variety of molding techniques. A large number of prior patents disclose wheels which are made by injection molding, but which are not hollow-form. Instead, these wheels have solid ribs or spokes which extend between a central hub and outer rim. Examples of such patents are U.S. Pat. Nos. 4,508,392 and 4,793,659. Other attempts to provide a molded plastic wheel suitable for use on bicycles are described in U.S. Pat. Nos. 3,862,779 and 4,818,034. In these patents a hollow-form wheel is assembled from split, mirror image halves and the assembly is retained by suitable fasteners or studs. While this approach can provide a hollow form wheel, it compromises the strength of the wheel and requires substantial manual assembly.

Another attempt to provide a plastic bicycle wheel is disclosed in U.S. Pat. No. 4,844,552. This patent describes a spokeless wheel having a solid center which is formed by an assembly of annular diaphragms between a central hub and outer rim. Although not patented, a molded plastic bicycle wheel has been marketed with limited success. This wheel is a three-spoke plastic wheel which is made by applying multiple layers of resin impregnated graphite fiber onto a rubber mandrel that is placed in a mold and heated to cure the resin. Thereafter, the rubber mandrel is extracted from the hub area of the wheel and a separate rim and a separate hub are bonded to the wheel by secondary bonding. This procedure is very tedious and relies substantially on custom hand fabrication. It does not provide the precision and accuracy that is desirable for consistent performance in quality of the wheel, and the strength of the wheel is lessened by the requirement that the rim and hub are not integrally formed.

OBJECTIVES OF THE INVENTION

It is an objective of this invention to provide a molded plastic wheel which is suitable for use as a bicycle wheel.

It is also an objective of this invention to provide an injection molded, hollow form spoked wheel.

It is a further objective of this invention to provide a molded plastic bicycle wheel having a strength and resiliency equal to or greater than that of a conventional metal spoke wheel.

It is also a further objective of this invention to provide a hollow form plastic bicycle wheel that can be manufactured using mass manufacturing techniques of injection molding.

It is an additional objective of this invention to provide a bicycle wheel which is molded with a high accuracy and precision and is of uniform strength and balance.

Other and related objectives will be apparent from the following description of the invention.

BRIEF DESCRIPTION OF THE INVENTION

This invention comprises a hollow-form wheel formed entirely by injection molding of plastic. The wheel has an integral, central sleeve to receive a wheel hub assembly, at least three, hollow-form, integral spokes that are symmetrically located at equal angular spacings about the hub, and an integrally formed annular rim having a peripheral channel to receive a tire. The wall thickness of the sidewalls of the rims and spokes and the central hub area of the wheel are of uniform thickness, which sufficient to provide the strength and stiffness properties at least equal to those of a metal spoke wheel.

BRIEF DESCRIPTION OF THE FIGURES

The invention will be described with reference to the figures of which;

FIG. 6 is a sectional view along line 6—6' of FIG. 1;
FIG. 7 is an enlarged view of the area 7—7' on FIG. 6;
FIG. 8 is an enlarged view of the area within line 8—8' on FIG. 6;
FIG. 9 is an enlarged view of the area within line 9—9' on FIG. 1;
FIG. 10 is an edge view of the molded wheel of the invention;
and
FIG. 11 is an enlarged view of an hub which is alternative to that shown in FIG. 9.

DESCRIPTION OF THE PREFERRED EMBODIMENT

Figure 1:
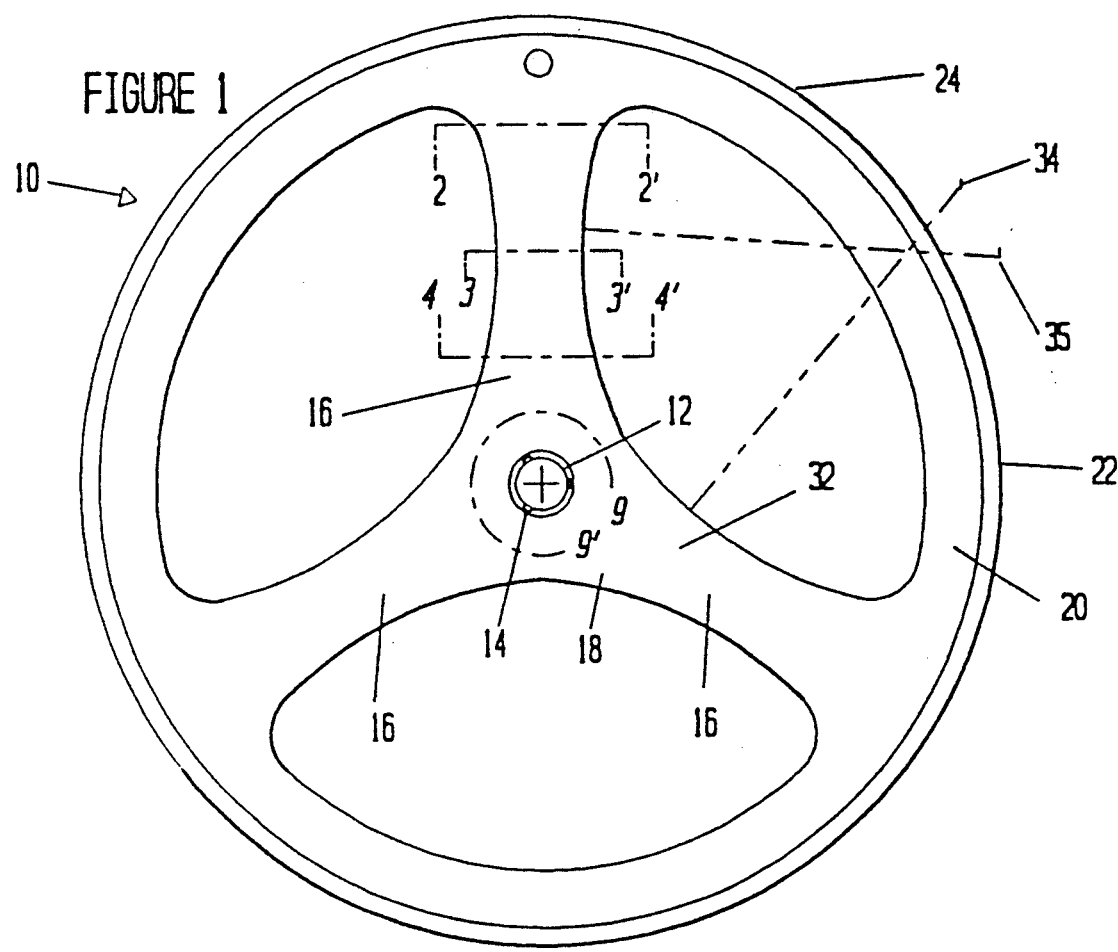
FIG. 1 is a side elevational view of the molded plastic wheel of the invention.
Figure 2:
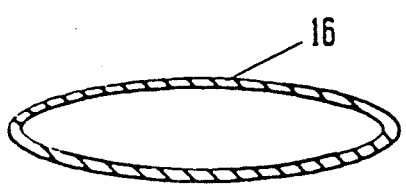
FIG. 2 is a sectional view along line 2—2' of FIG. 1.
Figure 4:
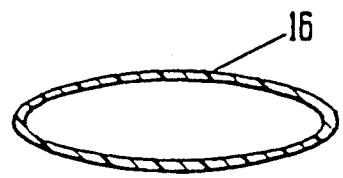
FIG. 4 is a sectional view along line 4—4' of FIG. 1.
Figure 3:
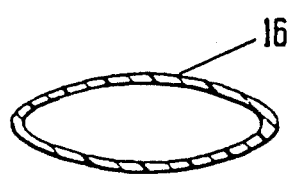
FIG. 3 is a sectional view along line 3—3' of FIG. 1.

Referring now to FIG. 1, the molded bicycle wheel 10 of the invention is shown as having a central sleeve 12 that, preferably, has a plurality of axial grooves 14 to receive a conventional bearing hub assembly (not shown). The sleeve 12 is integrally formed with the remainder of the wheel which comprises a plurality of spokes 16, preferably three, which extend radially outwardly from a hub area 18 to an annular rim 20. The annular rim 20 is formed with an outer peripheral channel 22 having sidewalls 24 to receive a conventional tire. As apparent from the sectional views of FIGS. 2, 3 and 4, the spokes 16 are ellipsoidal in shape, preferably with an elongated ellipsoidal contour as apparent in the sectional views.

The wheel is injection molded of thermoplastic resins, e.g., Nylon, polyphenylene sulfide, polyether imide, polyesters, polyurethane, etc., or of thermoset resins, e.g., epoxy resins. The resins are reinforced with long chopped fibers, such as fiberglass or, preferably, graphite fibers, which are added in amounts from 20 to about 75 volume percent of the resin. The fibers which are very useful have lengths from about 0.1 to about 0.75 inch. The preferred resin for most applications is Nylon reinforced with graphite fibers at a concentration about 50 volume percent. The sectional views of FIGS. 2–4 and FIGS. 7 and 8 are enlarged three-fold for greater clarity, and the thicknesses of the sidewalls is increased for illustration purposes. Preferably, spokes 16 have a ratio of width to thickness greater than unity and, most preferably, greater than 2 throughout their entire length. The wall thickness of the wheel is uniform throughout the wheel and is sufficient to provide a performance which is equal or greater than that of a conventional steel-spoke bicycle wheel. With the preferred plastic a wall thickness from 0.075 to 0.125 inch, preferably about 0.09 inch, provides the necessary stiffness, strength and flexibility to equal or exceed the performance of a conventional steel-spoked bicycle wheel.

Figure 5:
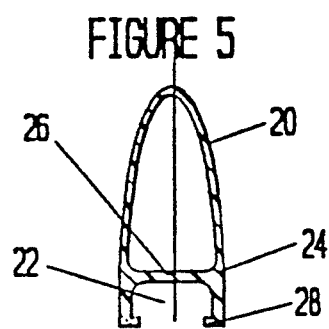
FIG. 5 is a sectional view along line 5—5' of FIG. 1.

Referring now to FIG. 5, the rim 20 also has a streamlined shape and, for this purpose, the rim is also hollow form and has a hemi-ellipsoidal contour, with a wide base wall 26 that forms the bottom wall of the outer peripheral channel 22. The peripheral channel 22 preferably has parallel sidewalls 24 which support coextensive inwardly directed annular lips 28, thereby forming a conventional channel rim to receive a conventional bicycle tire.

The spokes 16 and the rim 20 are joined with fillets having smooth radii. The spokes are formed with leading and trailing edges 30 and 32 which have radii of curvature at centers 34 and 35 that are located outside the circumference of the rim. This shape maximizes the aerodynamic and strength properties of the wheel.

Referring now to FIGS. 6 and 7, the shape of the central hub area 18 will be apparent. The area 18 is shown in sectional view in FIG. 6 and in an enlarged view in FIG. 7. As there illustrated, the central hub area 18 is also aerodynamically configured, with an outer edge 19 that is also hemi-elliptical in shape and is also of hollow form. The hub area 18 has a centrally located, integrally formed sleeve 12 which, preferably, has axial slots 14 as apparent from FIGS. 7 and 9 that provide for the indexing of a conventional metallic hub assembly. The sleeve 12 has a plurality of apertures 17 which communicate with the interior of each of the spokes 16. As described hereinafter, these apertures permitting draining of the molten eutectic metal mandrel after molding of the wheel.

The wheel also has provision for the inflation stem of a conventional type and, for this purpose, has at least one through aperture 36 in the annular rim 20. This aperture 36 is shown in greater detail in FIG. 8 which is an enlarged view of the area within line 8—8' of FIG. 6. As there illustrated, the through aperture 36 is formed with filleted edges 40 to provide a smooth transition and intersects a second through aperture 38 (along center line 39) that extends transversely through the base wall 26 of the outer peripheral channel 22 and through the sidewall of the through aperture 36, thereby providing for passage or insertion of the conventional inflation stem of a balloon tire.

The hub 12 and the area 18 about the hub are shown in FIGS. 9 and 11. As illustrated in FIG. 9, the hub 12 has a plurality of partial axial slots 14 which extend from one face thereof. These partial slots receive axial ribs which are located on the outer cylindrical casing of the standard metal hub and bearing assembly which fits into the integral plastic hub 12 of the wheel 10. In FIG. 11, the integral plastic hub 12 has a plurality of lobed-shaped cavities 14a which receive lobes that are located on the outer wall of the casing of a standard metal hub and bearing assembly. As shown in FIG. 7, the lobes 14a or slots 14 extend partially along the inside wall of the hub 12, preferably from about ⅛ to about ½ the axial length of the hub 12.

Referring now to FIG. 10, the base wall 26 of the annular peripheral rim 24 of the tire is formed with a plurality of elongated slots 42 that are spaced apart at equal angular increment about the periphery of the wheel. This is desirable to provide for minimum weight and these slots 42 can be provided without significantly comprising the rigidity and strength of the wheel. Additionally, the slots 42 permit drainage of most of the molten metal formed when the metal mandrel is melted, as described hereinafter.

The wheel of the invention is formed by injection molding. The hollow form structure of the wheel is achieved with injection molding of a resin about a preformed mandrel. The mandrel should be liquidifiable, i.e., be capable of a change in state from solid to liquid, and in the solid state should be stable to the molding conditions of temperature and pressure. It should also be capable of the change in physical state from solid to liquid under conditions which do not affect the molded products.

One method is to use a mandrel which is formed of a eutectic metal having a melt point which is slightly below the melt temperature of the thermoplastic polymer. Commercially available eutectic metals for this purpose are available from Electrovert, 655 Main St., East Greenwich, R.I. The mandrel is formed with very close tolerances to the interior dimensions of the injection mold cavity so that the hollow form wheel that is produced will have uniform wall thickness throughout, with the thickness as previously mentioned.

Another method is to use a mandrel which will dissolve in a solvent that is innocuous to the molded product, e.g., a mandrel formed of a water soluble polymer such as polyvinyl alcohol or acrylic copolyers, which can include a mineral filler for dimensional stability under the injection molding conditions.

The injection molding is conventional in procedure. The polymer is injected at a temperature above its melt point and flows into the mold cavity about the mandrel. The temperature of the mold is controlled in a conventional manner to obtain solidification of the polymer, which is ejected from the mold, still containing the metal mandrel. A typical cycle time for the injection molding is from 40 to about 75 seconds for thermoplastic resins, and from 2 to about 6 minutes for thermosetting resins.

The molded wheel and eutectic metal mandrel are then placed in an oil bath which is maintained at the melt temperature of the eutectic metal used for the mandrel. The oil bath heats the metal, melting it and the molten metal drains from the finished wheel through the apertures 42 located about the annular rim 22 of the wheel and from the apertures 17 in the hub sleeve 12, with the result that an entirely integral molded plastic wheel is obtained having a very uniform wall thickness, weight and strength.

The same procedure is followed with the soluble mandrel. The molded wheel and water-soluble mandrel are placed in a water bath which can be heated to a moderate temperature, e.g., from 100 to 200 degrees F. to hasten the rate of dissolution of the mandrel. The wheel is then removed, drained, rinsed and dried to obtain the finished product as a one-piece, hollow-form wheel.

Significantly, the wheel is formed with a high degree of balance, requiring little work to provide complete balance of wheel. The molten eutectic metal accumulates as a settled layer within the oil bath from where it can be drained for reuse in fabrication of the mandrels.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A single-piece, hollow-form bicycle wheel having a central hub, and a hollow-form annular rim formed with integral rim sidewalls and an integral rim base wall enclosing an annular cavity and joined to said central hub with hollow-form spokes, and said wheel formed entirely by injection molding of a fiber-reinforced plastic.

2. The bicycle wheel of claim 1 having at least three, hollow-form spokes having a width to thickness ratio greater than unity, integral with said hub and rim and symmetrically located thereabout at equal angular spacings.

3. The wheel of claim 2 wherein said spokes have ellipsoidal cross sections.

4. The bicycle wheel of claim 2 wherein said integrally formed annular rim has an annular-width to thickness ratio greater than unity.

5. The bicycle wheel of claim 1 wherein said central hub includes a central sleeve having an inside diameter for receiving a wheel hub assembly including wheel bearings.

6. The bicycle wheel of claim 5 including a plurality of axial slots on the inside wall of said sleeve to receive indexing ribs of a wheel hub assembly.

7. The wheel of claim 1 wherein said rim sidewalls and base wall together form an enclosure having a hemi-ellipsoidal cross section.

8. The wheel of claim 7 wherein said rim includes a radially outwardly facing peripheral channel having opposite side walls to receive a tire.

9. A single-piece, hollow-form bicycle wheel having a central hub, and a hollow-form annular rim formed with integral rim sidewalls and an integral rim base wall enclosing an annular cavity and joined together with hollow form spokes, and said wheel formed entirely by injection molding fiber-reinforce plastic and including:

a. a central sleeve having an inside diameter for receiving a wheel hub assembly including wheel bearings;

b. at least three, hollow-form spokes having a width to thickness ratio greater than unity, integral with said sleeve and symmetrically located thereabout at equal angular spacings;

c. a integrally formed hollow-form annular rim formed with integral rim sidewalls and an integral rim base wall enclosing an annular enclosure having an annular-width to thickness ratio greater than unity;

d. said rim, central sleeve and spokes together forming a single, confined hollow-form chamber;

with the sidewalls of said rim and spokes being sufficiently thick to provide the strength and stiffness properties substantially equal to those of a metal spoke wheel.

10. The wheel of claim 9 including three spokes.

11. The wheel of claim 9 wherein said rim and spokes have substantially uniform wall thickness.

12. The wheel of claim 11 wherein said wall thickness is from 0.075 to about 0.125 inch.

13. The wheel of claim 9 wherein said spokes have ellipsoidal cross sections.

14. The wheel of claim 13 wherein each edge of said spokes is formed with a radius of curvature having a center located outside the circumference of said rim.

15. The wheel of claim 14 wherein said spokes have a minimum width to thickness ratio greater than two.

16. The wheel of claim 9 wherein said rim is formed with an inner annular edge having a hemi-ellipsoidal cross section.

17. The wheel of claim 16 wherein the junctures of said spokes to said rim are filleted.

18. The wheel of claim 16 wherein said rim has a minimum annular-width to thickness ratio greater than two.

19. The wheel of claim 16 wherein said rim has a plurality of spaced-apart apertures along its cylindrical base wall.

20. The wheel of claim 16 including a single through aperture in said rim formed by an integrally molded sleeve and having a transversely oriented and communicating aperture through said cylindrical wall of said rim to receive a tire inflation stem.

21. The wheel of claim 9 wherein said plastic is fiber reinforced.

22. The wheel of claim 9 including a drain port formed in a sidewall of said wheel.

23. The wheel of claim 9 wherein said rim includes a radially outwardly facing peripheral channel having opposite side walls to receive a tire.

* * * * *